United States Patent [19]

Koike et al.

[11] 4,424,874
[45] Jan. 10, 1984

[54] DRIVE AXLE DEVICE

[75] Inventors: Kazuyoshi Koike, Ryugasaki; Junya Watanabe, Tone; Masami Someya, Ibaragi, all of Japan

[73] Assignee: Toyo Impanki Co., Ltd., Osaka, Japan

[21] Appl. No.: 291,152

[22] Filed: Aug. 7, 1981

[30] Foreign Application Priority Data

Dec. 22, 1980 [JP] Japan .............................. 55-182400

[51] Int. Cl.$^3$ ............................................. B60B 35/14
[52] U.S. Cl. .................................. 180/70 R; 74/391; 74/801
[58] Field of Search ................... 180/70.1, 255, 10; 74/391, 801

[56] References Cited

U.S. PATENT DOCUMENTS 2,953,040 9/1960 Christenson et al. ............. 74/801 X
2,998,735 9/1961 Elfes .............................. 180/70.1 X Primary Examiner—John A. Pekar
Attorney, Agent, or Firm—Sughrue, Mion, Zinn, Macpeak and Seas

[57] ABSTRACT

A drive axle device having the disk brake and planetary gear reducing unit at the outer end of the drive shaft and a wheel shaft outside said disk brake and gear reducing unit. The axle tube which incorporates the drive shaft terminates in a flanged portion at its outer end and encompasses the disk brake in the flanged portion. The disk is positioned on the drive shaft near the outer end thereof. Further out on the drive shaft is a sun gear which forms a part of the gear reducing unit. Also included in the latter unit are planetary gears which mesh with the sun gear, a planetary carrier for rotatably supporting the planetary gears, and a fixed ring gear which is fixed to a gear housing and meshes with the planetary gears. The gear housing is bolted to the flanged portion of the axle tube and encloses the gear reducing unit. A wheel shaft in line with the drive shaft is fixed on the planetary carrier to rotate therewith. A first bearing is between the wheel shaft and the gear housing, and a second bearing is between the planetary carrier and the gear housing.

6 Claims, 4 Drawing Figures

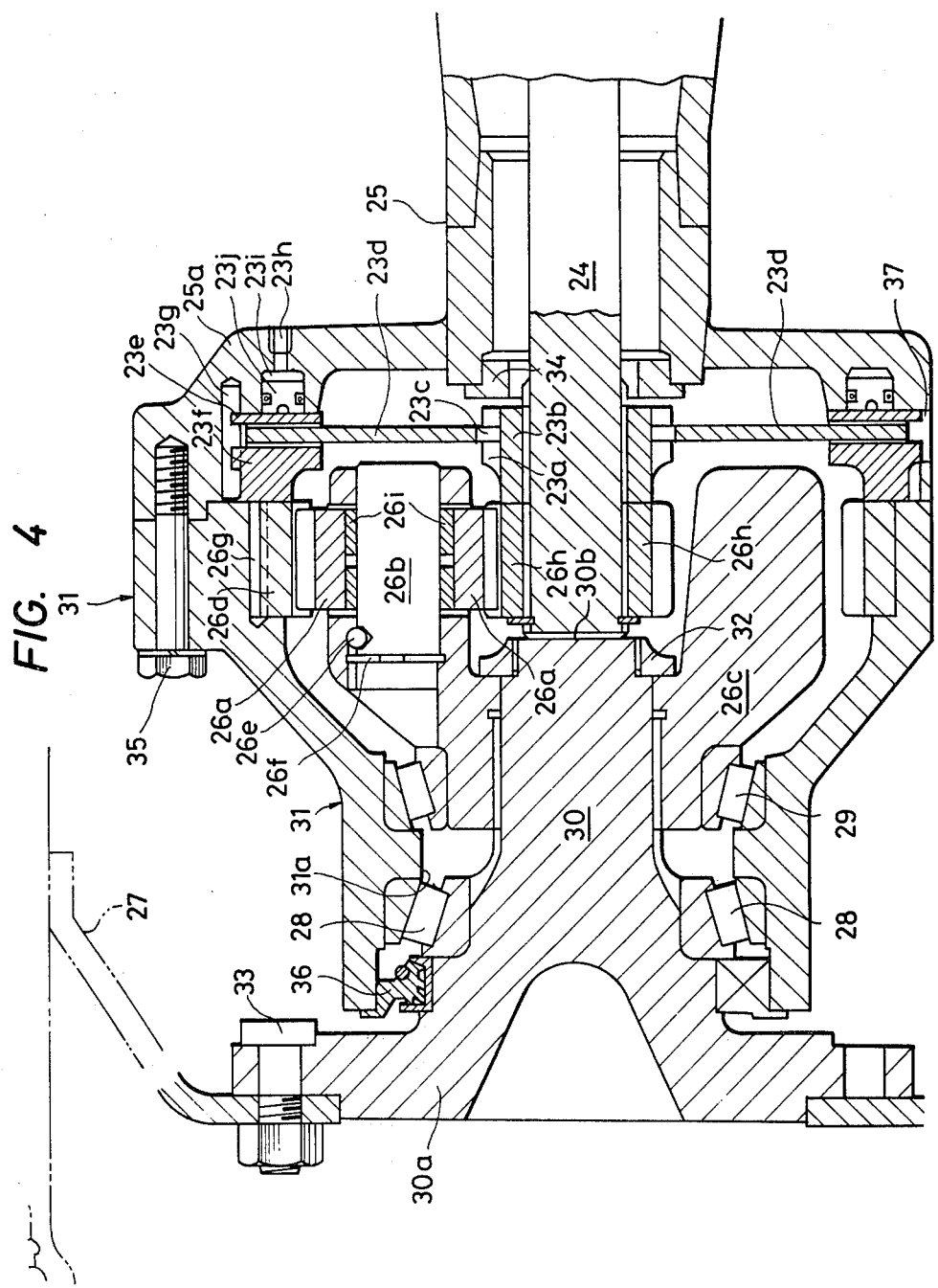

DRIVE AXLE DEVICE

BACKGROUND OF THE INVENTION

This invention relates to a drive axle device in a vehicle.

Conventional drive axle devices can be classified into semi-floating types, as shown in FIG. 1 and full-floating types, as shown in FIG. 2. In the semi-floating type drive axle device, as shown in FIG. 1, a differential gear unit 2 and disk brakes 3 are incorporated in a central housing 1, and planetary gear speed reducing units 6 are arranged at the brake sides of axle tubes 5 in which drive shafts 4 are incorporated. Each wheel 7 is supported by the axle tubes 5 through bearings 8 and 9 which are mounted directly on both ends of the drive shaft 4.

The semi-floating type drive axle device is disadvantageous in several respects. In order to overhaul either the gear unit 2, the brake 3, or the speed reducing unit 6, the axle tubes 5 and the drive shaft 4 must be removed from the vehicle body. Since the speed reducing unit 6 is disposed at the gear unit side of the drive shaft 4, the weight of the wheel 7 is imparted to the drive shaft 4, and accordingly it is necessary to increase the diameter of the drive shaft 4.

In the full-floating type drive axle device, as shown in FIG. 2, a planetary gear speed reducing unit 16 is arranged at the outer end of a drive shaft, a wheel mounting member 17a is rotatably supported through a pair of bearings 18 and 19 on the outer wall of the outer end portion of an axle tubes 15 in which the shaft 14 is incorporated, and a disk brake 13 is secured to the wheel mounting member 17a. By employment of the full-floating type drive axle device, the above-described drawbacks of the semi-floating type drive axle device can be substantially eliminated. However, the full-floating type drive axle device also has certain disadvantages. Since the planetary gear speed reducing unit 16 is arranged inside the wheel, the size of the wheel and the method of mounting the wheel are limited by the speed reducing unit 16.

SUMMARY OF THE INVENTION

In view of the foregoing, an object of this invention is to provide a drive axle device in which the advantages of the full-floating type drive axle device are utilized and the disadvantages of the semi-floating type drive axle device are eliminated.

BRIEF DESCRIPTION OF THE DRAWINGS

FIG. 4 is a sectional view showing the essential components of the drive axle device according to the invention.

DETAILED DESCRIPTION OF THE PREFERRED EMBODIMENTS

Figure 1:
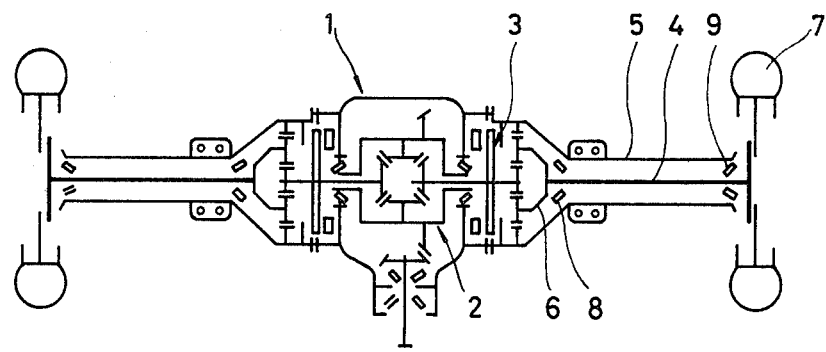
FIG. 1 is a schematic sectional view of a conventional semi-floating type drive axle device.
Figure 2:
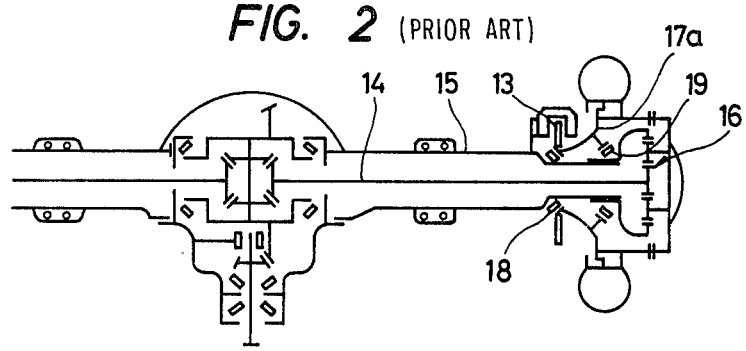
FIG. 2 is a schematic sectional view of a conventional full-floating type drive axle device.
Figure 3:
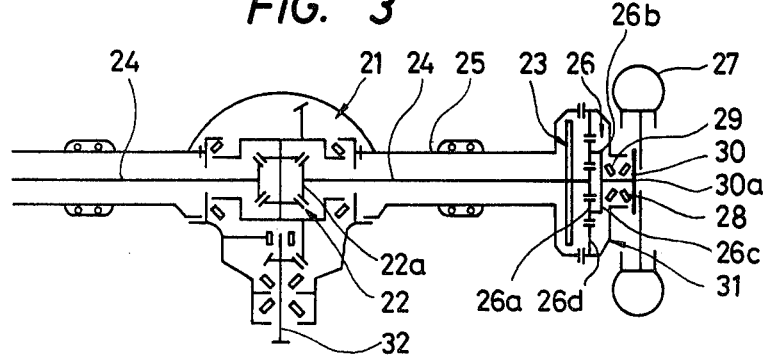
FIG. 3 is a schematic sectional view of a drive axle device which is one embodiment of this invention.

One embodiment of this invention will be described with reference to FIGS. 3 and 4. The drive axle device of the invention comprises: a differential gear unit 22 incorporated in a central housing 21 and driven by a propeller shaft 32; a pair of drive shafts 24 the inner ends of which are coupled to the output gears of the unit 22; axle tubes 25 incorporating the drive shafts 24, the inner ends of the axle tubes 25 being secured to the right and left ends of the housing 21; disk brakes 23 incorporated in the axle tubes 25 and secured to the outer ends of the shafts 24; planetary gear speed reducing units 26 connected to the outer ends of the shafts 24; a wheel shaft 30 having its central axis on the prolongation of the central axis of each shaft 24 and secured to a planetary carrier 26c adapted to rotatably support planetary gears 26a of the speed reducing unit 26; gear case 31 which is provided at the outer end of the drive shaft 24 holds the ring gear 26d of the speed reducing unit 26 fixedly inside the wheel 27 and has the inner end secured to the outer end of the axle tube 25; a first bearing 28 rotatably supporting the wheel shaft 30 on the inner wall 31a of the gear case 31; and a second bearing 29 rotatably supporting the planetary carrier 26c on the inner wall of the gear case 31.

The disk brake 23, as shown in FIG. 4, comprises: a brake hub 23b with a gear 23a spline-fitted onto the drive shaft 24; a disk 23d with a gear 23c engaged with the gear 23a of the hub 23b; an inner brake ring 23e and an outer brake ring 23f arranged on both sides of the disk in such a manner as to be movable horizontally as viewed in the figure; a pin 23g preventing the rotation of the brake rings 23e and 23f around the shaft 24; a high hydraulic pressure port 23h cut in the outer end flange 25a of the axle tube 25; a cylinder 23i communicating with the port; and a piston 23j sliding in the cylinder to depress the brake ring 23e against the disk.

The planetary gear speed reducing unit 26, as shown in FIG. 4, comprises: a sun gear 26h spline fitted onto the drive shaft 24; each planetary gear 26a engaged with the sun gear; a planetary carrier 26c supporting the planetary pin 26b of the gear 26a; a ball 26e preventing the rotation of the planetary pin 26b; a snap ring 26f preventing the horizontal movement of the pin 26b; a needle bearing 26i rotatably supporting the pin 26b and the planetary gear 26a; and the ring gear 26d engaged with the planetary gear 26a and secured to the gear case 31 with a pin 26g.

The planetary carrier 26c is spline-fitted onto the wheel shaft 30, and a nut 32 is screwed onto the inner end of the wheel shaft 30 to prevent the removal of the carrier 26c and to adjust the pre-load of the bearings 28 and 29. The first bearing 28 is arranged so that not only the radial stress of the shaft 30 is imparted to the first bearing 28 but also the thrust force of the carrier 26c is imparted to the bearing 28 towards the outer end of the shaft. Stud bolts are provided to mount the wheel 27 on the outer end flange 30a of the wheel shaft 30. The inner end face 30b of the shaft 30 receives the thrust force of the drive shaft 24 which is applied towards the outer end of the shaft. A stopper 34 is fixedly secured to the axle tube 25 to receive the thrust force of the drive shaft 24 which is applied towards the inner end of the shaft. The inner end portion of the gear case 31 is fixedly secured to the flange 25a of the axle tube 25 with bolts 35 so that it can be removed therefrom when necessary. An oil seal 36 is provided between the outer end portion of the gear case 31 and the shaft 30. A window 37 is cut in the flange 25a of the axle tube 25 to inspect the amount of wear of the brake.

The operation of the drive axle device thus constructed will be described.

Under the ordinary vehicle driving conditions, the power from the propeller shaft 32 is transmitted through the differential gear unit 22 and the drive shaft 24 to the sun gear 26h and the gear 23a, and the disk 23d coupled to the gear 23a is turned. The power transmitted to the sun gear 26h is transmitted to the planetary gear 26a. As the ring gear 26d is fixedly secured to the gear case, the speed is reduced, i.e., low speed and high torque is obtained. The resultant power is transmitted from the planetary carrier 26c to the wheel shaft 30 through the planetary pin 26b, to rotate the wheel 27.

When the brake pedal on the vehicle body is operated to brake the wheels, a high hydraulic pressure is applied to the piston 23j through the port 23h, as a result of which inner and outer brake rings 23e and 23f apply a stopping pressure to disk 23d. At the same time, the rotation of the hub 23b coupled to the disk 23d is stopped, as a result of which the power transmission mechanism from the drive shaft 24 to the wheel 27 is stopped.

When the brake pedal is released, the application of the high hydraulic pressure through the port 23h is eliminated, so that the piston 23j is returned to the former position and the disk 23d is released from the inner and outer brake rings 23e and 23f. Thus, the power is transmitted from the drive shaft to the wheel shaft 30 as usual to rotate the wheel.

As is apparent from the above description, according to the invention, the system from the differential gear unit to the planetary gear speed reducing unit is formed according to the full-floating system, while the system from the speed reducing unit to the wheel is formed according to the semi-floating system. Therefore, the wheel size and the wheel mounting method are not limited by the planetary gear speed reducing unit, and the diameter of the drive shaft can be reduced. Furthermore, according to the invention, the disk brake and the planetary gear speed reducing unit are arranged at the outer end of the drive shaft. Therefore, overhaul of these parts can be accomplished without removing the entire drive shaft, i.e., overhaul can be achieved merely by removing the components at the outer end of the shaft. Thus, the housing and the axle tube can be formed into one unit in the form of a Banjo axle, and can be formed by pressing a plate for a truck to reduce the weight. In addition, the invention has significant merit in that only the differential gear can be mounted or demounted if required.

What is claimed is:

1. A drive axle device comprising:
  a differential gear unit incorporated in a central housing and driven by a propeller shaft;
  a pair of drive shafts the inner ends of which are coupled to the output gears of said differential gear unit, respectively,
  axle tubes incorporating said drive shafts, the inner ends of said axle tubes being secured to the right and left ends of said central housing, respectively;
  disk brakes incorporated in said axle tubes and coupled to the outer ends of said drive shafts, respectively;
  planetary gear speed reducing units coupled to the outer ends of said drive shafts, respectively, each said planetary gear speed reducing unit comprising a sun gear arranged on said drive shaft to rotate therewith, planetary gear means engaging said sun gear, a planetary carrier adapted to rotatably support said planetary gear means, and a ring gear adapted to engage said planetary gear;
  wheel shafts having the central axes thereof in line with the central axes of said drive shafts and secured to said planetary carriers, respectively;
  a wheel secured to each of said wheel shafts;
  gear cases, each of which is provided at the outer end of the respective drive shaft, each said gear case fixedly holding a respective ring gear and having its inner end thereof secured to the outer end of the respective axle tube;
  first bearings rotatably supporting said wheel shafts on the inner walls of said gear cases, respectively;
  second bearings rotatably supporting said planetary carriers on the inner walls of said gear cases, respectively; and
  said planetary gear speed reducing units each being located outside of but closely adjacent each of said wheels on the side thereof toward said central housing.

2. A drive axle device as claimed in claim 1 wherein said wheel shafts extend outside the outer ends of said gear casings for mounting said wheels, respectively.

3. A drive axle device as claimed in claim 1 wherein said planetary gear speed reducing units are positioned on the outer ends of drive shafts further out than the positions of said disk brakes, respectively.

4. A drive axle device as claimed in claim 1 wherein said wheel shaft is in thrust contact with said drive shaft.

5. A drive axle device as claimed in claim 1 wherein said axle tubes include flanged portions at their outer ends, respectively, said disk brakes being incorporated within said flanged portions, respectively.

6. A drive axle device as claimed in claim 1 wherein each of said disk brakes comprises a disk coupled to said drive shaft, and hydraulically operated brake rings for applying a stopping force to said disk.

* * * * *